United States Patent
Iwasaki

(10) Patent No.: US 12,142,991 B2
(45) Date of Patent: Nov. 12, 2024

(54) MOTOR

(71) Applicant: Nidec Corporation, Kyoto (JP)

(72) Inventor: Shuji Iwasaki, Kyoto (JP)

(73) Assignee: NYDEC CORPORATION, Kyoto (JP)

( * ) Notice: Subject to any disclaimer, the term of this patent is extended or adjusted under 35 U.S.C. 154(b) by 234 days.

(21) Appl. No.: 17/949,267

(22) Filed: Sep. 21, 2022

(65) Prior Publication Data

US 2023/0094248 A1 Mar. 30, 2023

(30) Foreign Application Priority Data

Sep. 30, 2021 (JP) .................................. 2021-162419

(51) Int. Cl.
*H02K 5/22* (2006.01)
*H02K 5/16* (2006.01)
*H02K 11/215* (2016.01)
*H02K 11/33* (2016.01)

(52) U.S. Cl.
CPC ............. *H02K 5/225* (2013.01); *H02K 5/161* (2013.01); *H02K 11/215* (2016.01); *H02K 11/33* (2016.01); *H02K 2203/09* (2013.01); *H02K 2211/03* (2013.01)

(58) Field of Classification Search
CPC ...... H02K 5/225; H02K 5/161; H02K 11/215; H02K 11/33; H02K 2203/09; H02K 2211/03
See application file for complete search history.

(56) References Cited

U.S. PATENT DOCUMENTS

| 8,922,080 | B2 * | 12/2014 | Nakagawa | ............. | H01R 43/16 310/71 |
| 2015/0357878 | A1 * | 12/2015 | Fukunaga | ................ | H02K 5/16 310/71 |
| 2016/0294248 | A1 * | 10/2016 | Atarashi | .................. | H02K 5/16 |
| 2018/0248438 | A1 | 8/2018 | Ogawa et al. | | |

FOREIGN PATENT DOCUMENTS

| JP | 2016-021838 A | 2/2016 |
| JP | 2018-170953 A | 11/2018 |
| JP | 2020-145883 A | 9/2020 |
| WO | 2017/026492 A1 | 2/2017 |

* cited by examiner

*Primary Examiner* — Jue Zhang
(74) *Attorney, Agent, or Firm* — Keating & Bennett, LLP

(57) ABSTRACT

A motor includes a rotor, a stator, a bearing, a motor housing, a bearing holder, and a bus bar. The rotor includes an axially extending shaft. The stator radially opposes the rotor. The bearing rotatably supports the shaft. The motor housing accommodates the stator and opens to one axial side. The bearing holder holds the bearing and covers the opening of the motor housing. The bus bar is connected to the conductive wire drawn out from the stator and is located on the bearing holder. The bearing holder includes a recess radially outside of the bearing and including an upper surface recessed to the other axial side. The bus bar includes a base portion and a connection portion. The base portion is located radially outside of the recess and extends in the circumferential direction.

12 Claims, 5 Drawing Sheets

MOTOR

CROSS-REFERENCE TO RELATED APPLICATIONS

The present application claims priority under 35 U.S.C. § 119 to Japanese Patent Application No. 2021-162419, filed on Sep. 30, 2021, the entire contents of which are hereby incorporated herein by reference.

1. Field of the Invention

The present disclosure relates to a motor.

2. Background

A conventional motor includes a rotor, a stator, an upper bearing, a housing, and a bus bar. The rotor has an axially extending shaft. The stator radially opposes the rotor. The upper bearing rotatably supports the shaft. The housing accommodates the stator. The top plate portion of the housing holds the upper bearing. The bus bar includes a plate-shaped portion located on the top plate portion, and a terminal protruding axially upward from an upper surface of the plate-shaped portion. The terminal is connected to the conductive wire drawn out from the stator.

However, in the conventional motor, when the circuit board is disposed axially above the bus bar and the circuit board is spaced away from the terminal in the axial direction, there is a possibility that the motor increases in size in the axial direction.

SUMMARY

A motor according to an example embodiment of the present disclosure includes a rotor, a stator, a bearing, a motor housing, a bearing holder, and a bus bar. The rotor includes an axially extending shaft. The stator radially opposes the rotor. The bearing rotatably supports the shaft. The motor housing accommodates the stator and opens to one axial side. The bearing holder holds the bearing and covers the opening of the motor housing. The bus bar is connected to the conductive wire drawn out from the stator and is located on the bearing holder. The bearing holder includes a recess. The recess is located radially outside of the bearing and includes an upper surface recessed to another axial side. The bus bar includes a base portion and a connection portion. The base portion is located radially outside of the recess and extends in the circumferential direction. The connection portion extends from the base portion to the other axial side and is connected to the conductive wire. At least a portion of the connection portion is located in the recess.

The above and other elements, features, steps, characteristics and advantages of the present disclosure will become more apparent from the following detailed description of the example embodiments with reference to the attached drawings.

DETAILED DESCRIPTION

Figure 1:
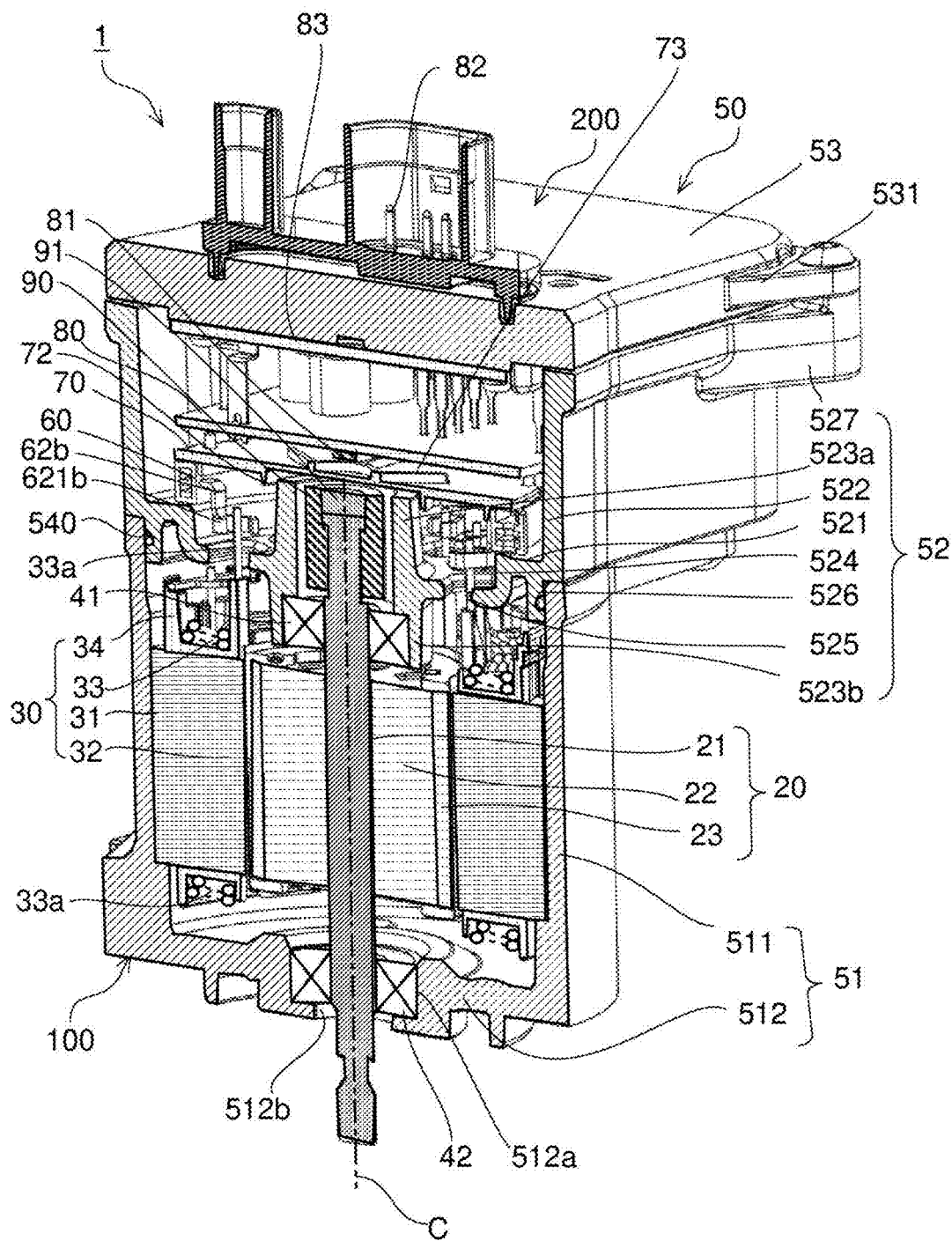
FIG. 1 is a perspective view of a vertical cross section of a motor according to an example embodiment of the present disclosure.

Hereinafter, example embodiments of the present disclosure will be described in detail with reference to the accompanying drawings. Note that a direction in which the center axis C of the motor 1 illustrated in FIG. 1 extends is simply referred to as an "axial direction", and a radial direction and a circumferential direction around the center axis C of the motor 1 are simply referred to as a "radial direction" and a "circumferential direction". Note that the "axial direction", the "radial direction", and the "circumferential direction" are names used merely for description, and do not limit the actual positional relationship or direction. In the present example embodiment, for convenience of description, the axial direction is defined as the vertical direction, and the vertical direction in FIG. 1 is defined as the vertical direction of the motor, and the shape and positional relationship of each part will be described. For example, one axial side is defined as an axially upper side or an upper side. The other axial side is defined as an axially lower side or a lower side. Further, one axial end is defined as an upper end, and the axially other end is defined as a lower end. However, there is no intention to limit the direction at the time of manufacture and use of a motor 1 according to the disclosure by this definition of the vertical direction.

Figure 2:
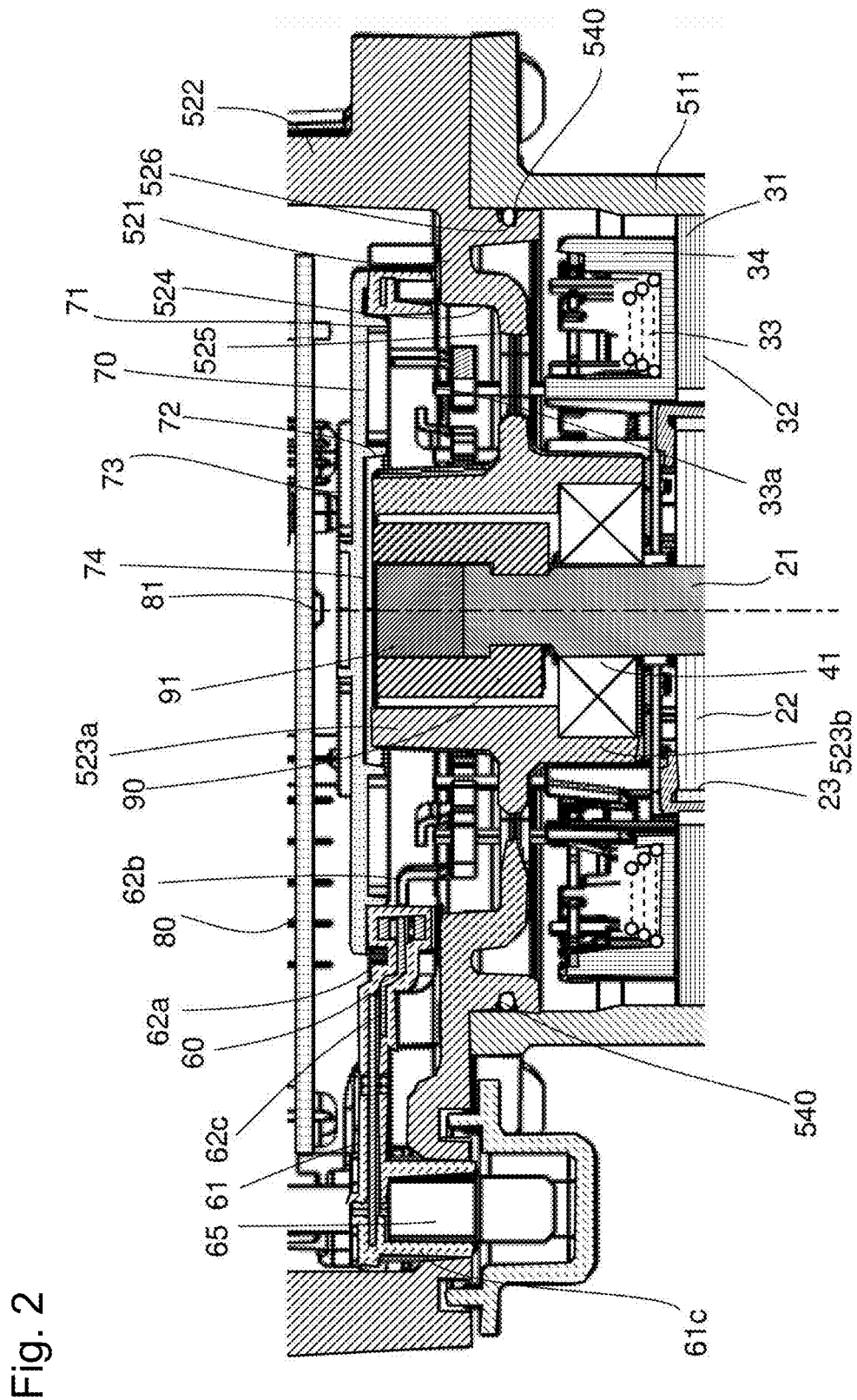
FIG. 2 is an enlarged longitudinal sectional view illustrating a portion of a motor according to an example embodiment of the present disclosure.
Figure 3:
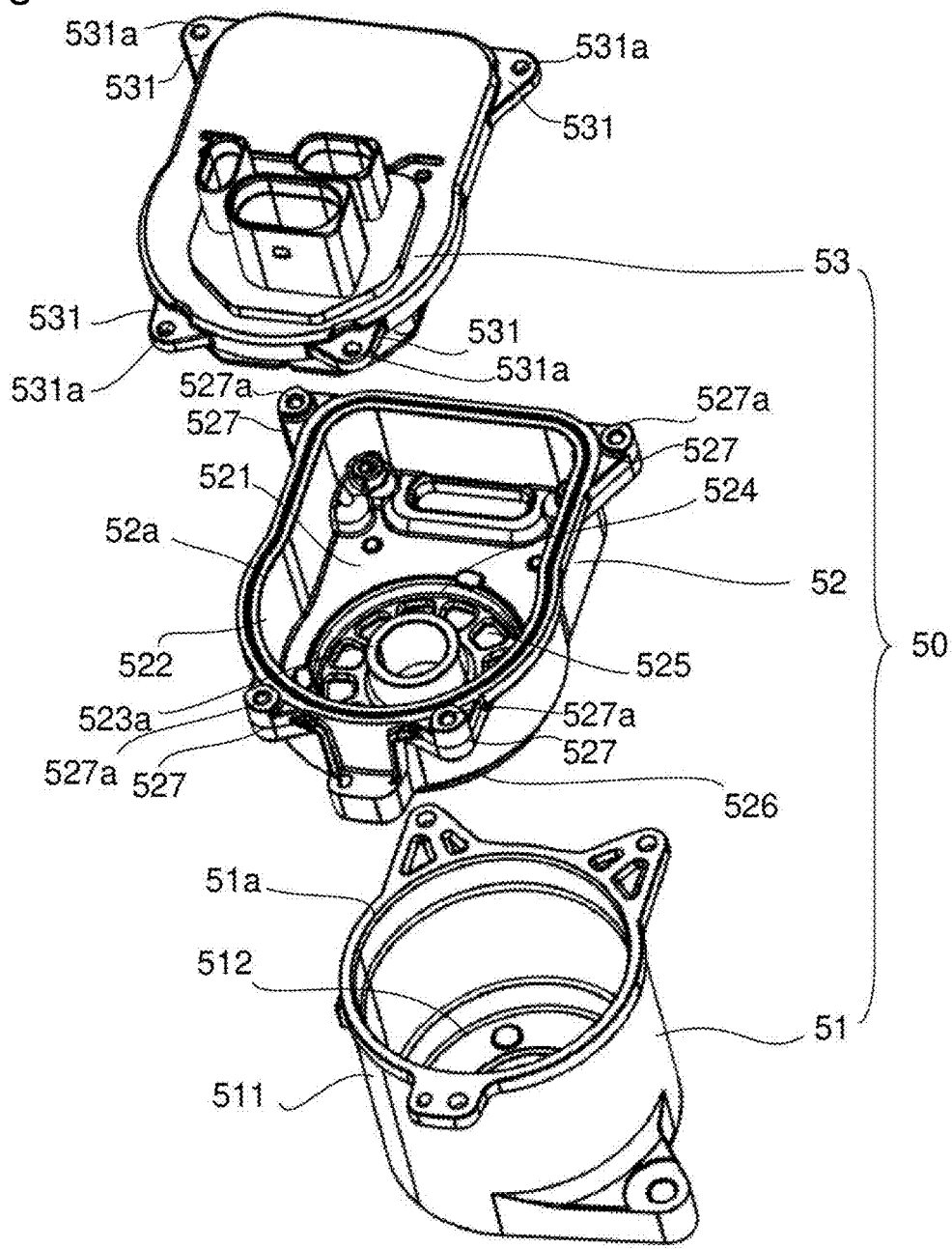
FIG. 3 is an exploded perspective view of a housing of a motor according to an example embodiment of the present disclosure.

A motor according to an example embodiment of the present disclosure will be described. FIG. 1 is a longitudinal sectional perspective view of a motor 1 according to the example embodiment of the present disclosure, and FIG. 2 is an enlarged longitudinal sectional view illustrating surroundings of a bus bar assembly 60 of the motor 1. FIG. 3 is an exploded perspective view of a housing 50. In the motor 1, a motor body 100 and a control unit 200 are integrated. The motor body 100 includes a rotor 20 and a stator 30, and the control unit 200 is located axially above the motor body 100 and controls the rotation of the rotor 20.

Specifically, the motor body 100 includes the rotor 20, the stator 30, an upper bearing (bearing) 41, a lower bearing 42, the housing 50, and a motor cover 70. The control unit 200 includes a first circuit board (circuit board) 80, a second circuit board 83, the bus bar assembly 60, and a connector unit 82. That is, the motor 1 includes the rotor 20, the stator 30, the upper bearing (bearing) 41, the housing 50, the bus bar assembly 60, and the motor cover 70.

The housing 50 includes a motor housing 51, a bearing holder 52, and a cover 53.

The motor housing 51 is formed in a bottomed cylindrical shape, and accommodates the rotor 20 and the stator 30 therein. The motor housing 51 includes a side wall portion 511 and a bottom wall portion 512. The side wall portion 511 extends axially upward and is formed in a cylindrical shape. The upper surface of the side wall portion 511 is opened to form an opening 51a. The lower face of the side wall portion 511 is covered with a plate-shaped bottom wall portion 512. The bottom wall portion 512 includes a lower bearing holding portion 512a. The lower bearing holding portion 512a is located on a center axis C, and has an upper surface recessed in the axial direction. The lower bearing 42 is accommodated and held in the lower bearing holding portion 512a. A bottom wall through hole 512b penetrating in the axial direction is formed in the bottom face of the lower bearing holding portion 512a.

The bearing holder 52 is disposed axially above the motor housing 51 and is formed in a bottomed cylindrical shape. The bearing holder 52 accommodates the bus bar assembly 60 and an upper bearing 41 therein. The bearing holder 52 includes an intermediate wall portion 521, a peripheral wall portion 522, an upper cylindrical portion (cylindrical portion) 523a, a lower cylindrical portion 523b, a recess 524, a bearing holder through hole 525, an annular coupling portion (coupling portion) 526, and a bearing holder flange portion 527.

The intermediate wall portion 521 is formed in a plate shape and covers the opening 51a of the motor housing 51. The peripheral wall portion 522 extends axially upward from the peripheral edge of the intermediate wall portion 521 and is formed in a tubular shape. The upper surface of the peripheral wall portion 522 is opened to form a bearing holder opening 52a.

The upper cylindrical portion 523a surrounds the center axis C, extends axially upward from the upper surface of the intermediate wall portion 521, and is formed in a cylindrical shape. A magnet holding portion 90 and a sensor magnet 91 described later are located in the upper cylindrical portion 523a. That is, the bearing holder 52 has the tubular upper cylindrical portion (cylindrical portion) 523a that surrounds the center axis C and in which the magnet holding portion 90 is disposed.

The lower cylindrical portion 523b surrounds the center axis C and extends axially downward from the lower face of the intermediate wall portion 521 to be formed in a cylindrical shape. The lower cylindrical portion 523b accommodates and holds the upper bearing 41. The upper cylindrical portion 523a and the lower cylindrical portion 523b communicate with each other in the axial direction.

The recess 524 is located radially outside of the upper cylindrical portion 523a and the lower cylindrical portion 523b, and is recessed axially downward from the upper surface of the intermediate wall portion 521. That is, the bearing holder 52 has the recess 524 that is located radially outside of the upper bearing (bearing) 41 and has an upper surface recessed axially downward (the other axial side). The recess 524 is formed in an annular shape surrounding the upper cylindrical portion 523a and the lower cylindrical portion 523b in top view. The bearing holder through hole 525 penetrates the bottom face of the recess 524 in the axial direction. A plurality of the bearing holder through holes 525 is located in the circumferential direction. In the present example embodiment, 12 bearing holder through holes 525 are provided.

The annular coupling portion (coupling portion) 526 protrudes axially downward (the other axial side) from the lower face of the intermediate wall portion 521 and is formed in an annular shape surrounding the recess 524. The annular coupling portion 526 is press-fitted into the inner surface of the side wall portion 511 of the motor housing 51 with an annular packing 540 having an O-shaped cross section interposed on the outer peripheral face thereof. That is, the annular coupling portion 526 is fitted into the opening of the motor housing 51. As a result, the bearing holder 52 and the motor housing 51 are fixed. At this time, the lower end (the axially other end) of the recess 524 is located axially above (one axial side) the lower end (the axially other end) of the annular coupling portion 526. Thus, the recess 524 can be prevented from contacting the stator 30 in the motor housing 51.

The bearing holder flange portion 527 protrudes radially outward from the upper end portion of the peripheral wall portion 522. The four bearing holder flange portions 527 are provided on the outer peripheral portion of the peripheral wall portion 522. The bearing holder flange portion 527 has a bearing holder screw hole 527a extending in the axial direction.

The cover 53 is formed in a plate shape and covers the bearing holder opening 52a. The cover 53 has a cover flange portion 531. The cover flange portion 531 protrudes radially outward from the outer peripheral portion of the cover 53. The four cover flange portions 531 are provided on the outer peripheral portion of the cover 53. The cover flange portion 531 has an axially penetrating cover hole 531a. By aligning and screwing the cover hole 531a and the bearing holder screw hole 527a, the cover 53 and the bearing holder 52 are fixed.

The rotor 20 includes a shaft 21, a rotor core 22, and a rotor magnet 23. The shaft 21 forms a rotation axis extending along the center axis C and is formed in a columnar shape. That is, the rotor 20 has the axially extending shaft 21. The shaft 21 is rotatably supported by the upper bearing 41 and the lower bearing 42 about the axis.

The lower end portion of the shaft 21 protrudes outside of the motor housing 51 through the bottom wall through hole 512b. The upper end portion of the shaft 21 is located inside the upper cylindrical portion 523a.

The rotor core 22 is formed in a cylindrical shape, and the shaft 21 is fixed inside by press fitting. The rotor magnet 23 is provided on the radially outer surface of the rotor core 22, and a plurality of rotor magnets is located in the circumferential direction. The rotor core 22 and the rotor magnet 23 rotate integrally with the shaft 21.

The stator 30 is located radially outside of the rotor 20. That is, the stator 30 faces the rotor 20 in the radial direction. The stator 30 is formed in a tubular shape, and the rotor 20 is located inside. The stator 30 includes a core back portion 31, a tooth portion 32, a coil portion 33, and an insulating member 34.

The core back portion 31 has a cylindrical shape concentric with the shaft 21. The outer peripheral face of the core back portion 31, that is, the outer peripheral face of the stator 30, is fitted to the inner peripheral face of the side wall portion 511 of the motor housing 51.

The tooth portion 32 extends radially inward from the inner peripheral face of the core back portion 31. A plurality of the tooth portions 32 is provided and located at equal intervals in the circumferential direction of the inner peripheral face of the core back portion 31. In the present example embodiment, 12 tooth portions 32 are provided.

The coil portion 33 is configured by winding a conductive wire 33a around the insulating member 34. The insulating member 34 is attached to each tooth portion 32. The end portion of the conductive wire 33a wound around each tooth portion 32 extending axially upward, passes through each bearing holder through hole 525, and is located inside the bearing holder 52.

When a drive current is supplied to the coil portion 33, a magnetic field is generated, and the rotor 20 rotates by the magnetic field.

The rotation of the shaft 21 is detected by the sensor magnet 91 and a sensor 81 mounted on a first circuit board 80 described later. The detected signal is directly transmitted to the CPU via the first circuit board 80 and processed.

The sensor magnet 91 is an annular permanent magnet, and the N pole and the S pole are located on a surface facing the sensor 81. The sensor magnet 91 is fitted to the inner peripheral face of the tubular magnet holding portion 90, and the magnet holding portion 90 is fitted to the upper end portion of the shaft 21.

In the present example embodiment, the sensor magnet 91 is fixed inside the magnet holding portion 90. As a result, the sensor magnet 91 is connected to the shaft 21 via the magnet holding portion 90 and is rotatably disposed together with the shaft 21. At this time, the upper end (one axial end) of the magnet holding portion 90 is disposed axially below (on the other axial side) the upper end (one axial end) of the upper cylindrical portion (cylindrical portion) 523a. As a result, it is possible to prevent the sensor magnet 91 from hitting other parts and being damaged at the time of assembling the motor 1. The magnet 91 may be directly fixed to the tip of the shaft 21 with an adhesive or the like.

The first circuit board (circuit board) 80 and the second circuit board 83 are accommodated in the bearing holder 52. The first circuit board 80 and the second circuit board 83 extend perpendicularly to the center axis C and are formed in a plate shape. The second circuit board 83 is disposed axially above the first circuit board 80 with a predetermined gap interposed therebetween. When viewed from the axial direction, the first circuit board 80 and the second circuit board 83 are disposed so as to overlap each other.

The first circuit board 80 is disposed axially above the bearing holder 52. Specifically, the lower face of the first circuit board 80 and the upper surface of the upper cylindrical portion 523a of the bearing holder 52 axially face each other with a gap interposed therebetween. The motor cover 70 to be described later is disposed between the first circuit board 80 and the upper surface of the upper cylindrical portion 523a.

Electronic components (not illustrated) such as the sensor 81, an electrolytic capacitor, and a choke coil are mounted on at least one of the upper surface and the lower face of the first circuit board 80 or the upper surface and the lower face of the second circuit board 83.

The first circuit board 80 and the second circuit board 83 are electrically connected by connection pins (not illustrated). As a result, the electronic component (not illustrated) is mounted at a predetermined position on the first circuit board 80 or the second circuit board 83 according to thermal characteristics. In the present example embodiment, the sensor 81 is located on the lower face of the first circuit board 80.

The first circuit board 80 outputs a motor drive signal to a stator 40 via the bus bar assembly 60. The first circuit board 80 is disposed axially above the bus bar assembly 60, and the sensor 81 that detects the rotational position of the rotor 20 is mounted on the lower face of the first circuit board 80. That is, the first circuit board 80 is disposed axially above bus bars 62U, 63V, and 64W described later inside the bearing holder 52.

The sensor 81 is disposed axially above (one axial side) the sensor magnet 91. That is, the sensor 81 is disposed axially above (one axial side) the shaft 21. The sensor 81 detects the magnetic flux of the sensor magnet 91 located on the upper end portion (one side end portion in the axial direction) of the shaft 21 to detect the rotational position of the rotor 20. As a result, a motor drive signal corresponding to the rotational position of the rotor 20 is output, and the drive current supplied to the coil portion 33 is controlled. Therefore, the driving of the motor 1 can be controlled.

In the present example embodiment, the sensor magnet 91 is located on the upper end portion of the shaft 21. Further, the sensor 81 is disposed to axially face the sensor magnet 91. Therefore, the distance between the sensor 81 and the sensor magnet 91 is short, and the magnetoresistance element can be suitably used for the sensor 81. As a result, the resolution of the sensor 81 is improved, and the rotational position of the shaft 21 can be accurately detected. Therefore, the responsiveness of the motor 1 can be improved.

Figure 4:
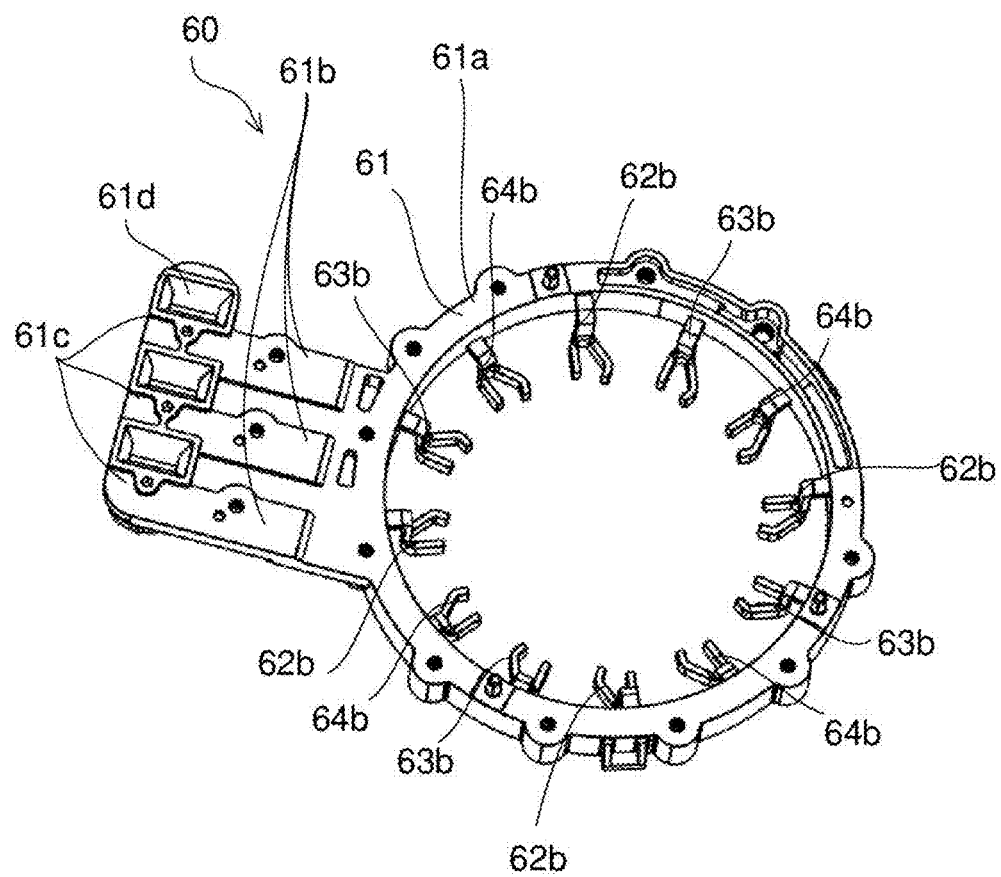
FIG. 4 is a perspective view of a bus bar assembly of a motor according to an example embodiment of the present disclosure.
Figure 5:
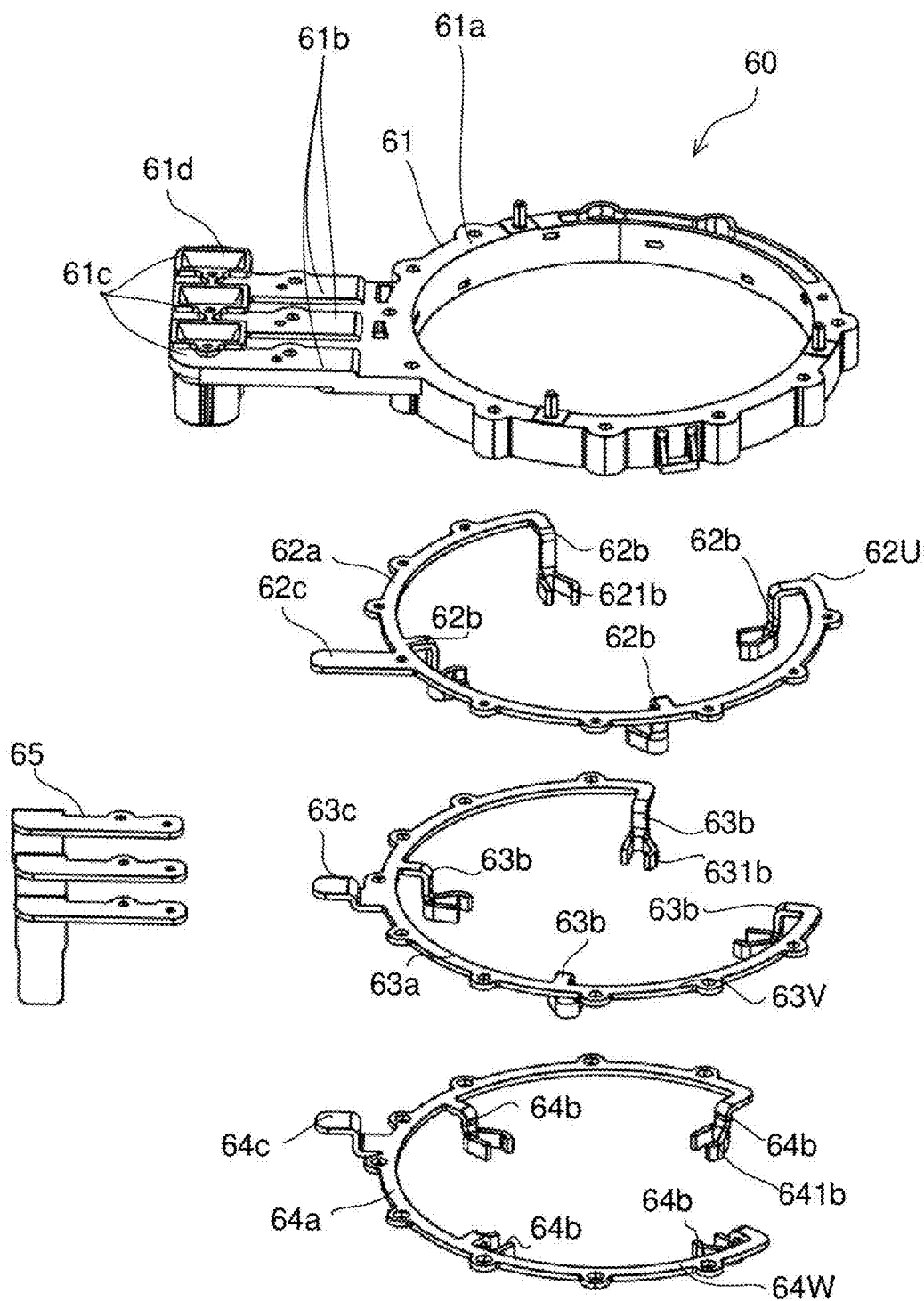
FIG. 5 is an exploded perspective view of a motor bus bar assembly according to an example embodiment of the present disclosure.

FIGS. 4 and 5 are a perspective view and an exploded perspective view of the bus bar assembly 60. The bus bar assembly 60 is located radially outside of the upper bearing 41 in the bearing holder 52.

The bus bar assembly 60 includes a bus bar holder 61, bus bars 62U, 63V, and 64W, and a bus bar side connection terminal 65. The bus bars 62U, 63V, and 64W are formed of plate-like members having conductivity, and have shapes different from each other. In the present example embodiment, the bus bar 62U corresponds to the U-phase, the bus bar 63V corresponds to the V-phase, and the bus bar 64W corresponds to the W-phase.

The bus bar 62U includes a base portion 62a, a connection portion 62b, and a terminal portion 62c. The base portion 62a extends in the circumferential direction and is formed in an arc shape in top view.

The connection portion 62b protrudes radially inward from the radially inner surface of the base portion 62a, and the distal end portion is bent axially downward. Four connection portions 62b are provided and located at equal intervals in the circumferential direction. The connection portion 62b has a conductive wire holding portion 621b. The conductive wire holding portion 621b protrudes radially inward from the distal end portion of the connection portion 62b and is formed in a substantially U shape in top view. The terminal portion 62c linearly extends radially outward from the radially outer surface of the base portion 62a.

The bus bar 63V includes a base portion 63a, a connection portion 63b, and a terminal portion 63c. The base portion 63a extends in the circumferential direction and is formed in an arc shape in top view.

The connection portion 63b protrudes radially inward from the radially inner surface of the base portion 63a, and the distal end portion thereof is bent axially downward. The four connection portions 63b are provided and located in the circumferential direction at equal intervals. The connection portion 63b has a conductive wire holding portion 631b. The conductive wire holding portion 631b protrudes radially inward from the distal end portion of the connection portion 63b and is formed in a substantially U shape in top view. The terminal portion 63c protrudes axially upward from the radially outer surface of the base portion 63a, and the distal end portion thereof extends and is bent radially outward.

The bus bar 64W includes a base portion 64a, a connection portion 64b, and a terminal portion 64c. The base portion 64a extends in the circumferential direction and is formed in an arc shape in top view.

The connection portion 64b protrudes radially inward from the radially inner surface of the base portion 64a, and the distal end portion thereof is bent axially downward. The four connection portions 64b are provided and located in the circumferential direction at equal intervals. The connection portion 64b has a conductive wire holding portion 641b. The conductive wire holding portion 641b protrudes radially inward from the distal end portion of the connection portion 64b and is formed in a substantially U shape in top view. The terminal portion 64c protrudes axially upward from the radially outer surface of the base portion 64a, and the distal end portion thereof extends and is bent radially outward.

The base portion 64a, the base portion 63a, and the base portion 62a are formed in a thin plate shape and sequentially overlap in the axial direction with a spacer (not illustrated) interposed therebetween. As a result, the bus bar assembly 60 can be thinned in the axial direction. The spacer is formed of, for example, a material having an insulating property such as resin.

In a state where the base portion 64a, the base portion 63a, and the base portion 62a overlap, the connection portion 62b, the connection portion 63b, and the connection portion 64b are located in order in the circumferential direction at equal intervals (see FIG. 4). At this time, the lower end of the connection portion 62b, the lower end of the connection portion 63b, and the lower end of the connection portion 64b are located at substantially the same axial height. In addition, the plurality of connection portions 62b, 63b, and 64b protrude radially inward from the radially inner surfaces of the base portions 62a, 63a, and 64a, respectively, and the bus bar assembly 60 can be downsized in the radial direction.

The conductive wire holding portions 621b, 631b, and 641b are electrically connected to the distal end portion of the conductive wire 33a extending axially upward by laser welding or the like. That is, the connection portion 62b extends axially downward (the other axial side) from the base portion 62a and is connected to the conductive wire 33a. The connection portion 63b extends axially downward from the base portion 63a and is connected to the conductive wire 33a. The connection portion 64b extends axially downward from the base portion 64a and is connected to the conductive wire 33a.

Accordingly, in a state where the bus bar assembly 60 is placed on the bearing holder 52, at least part of the base portions 62a, 63a, and 64a overlaps with the sensor magnet 91 in the radial direction. Further, the distal end portion of the connection portion 62b can be disposed away from the first circuit board 80 in the axial direction. Therefore, it is possible to reduce the influence of the magnetic field generated at the distal end portion of the connection portion 62b on the first circuit board 80. That is, it is possible to provide the motor 1 capable of reducing the influence of the magnetic field generated in the bus bars 62U, 63V, and 64W.

The lower ends of the connection portions 62b, 63b, and 64b are disposed axially below the upper end of the magnet holding portion 90. At least part of the connection portions 62b, 63b, and 64b is located in the recess 524. Accordingly, even when the connection portions 62b, 63b, and 64b are disposed away from the first circuit board 80 in the axial direction, it is possible to suppress an increase in size of the motor 1 in the axial direction.

The terminal portion 62c, the terminal portion 63c, and the terminal portion 64c are disposed adjacent to each other in the circumferential direction. In addition, the distal end portion of the terminal portion 62c, the distal end portion of the terminal portion 63c, and the distal end portion of the terminal portion 64c are located at the same axial height. The heights of the upper surfaces of the terminal portion 62c, the terminal portion 63c, and the terminal portion 64c are substantially the same as the height of the upper surface of the base portion 62a in the axial direction. Thus, the bus bar assembly 60 can be downsized in the axial direction. The terminal portion 62c, the terminal portion 63c, and the terminal portion 64c are connected to the bus bar side connection terminal 65.

The bus bar side connection terminal (external connection terminal) 65 is connected to the terminal portion 62c, the terminal portion 63c, and the terminal portion 64c. The bus bar side connection terminal 65 is electrically connected to the first circuit board 80 and the second circuit board 83.

The bus bar holder 61 is made of an insulating material such as resin. The bus bar holder 61 covers the outer surfaces of the base portions 62a, 63a, and 64a, the terminal portions 62c, 63c, and 64c of the bus bars 62U, 63V, and 64W, and the bus bar side connection terminal 65. In the present example embodiment, the bus bars 62U, 63V, and 64W are embedded and fixed in the bus bar holder 61 by insert molding. Thus, the bus bars 62U, 63V, and 64W are insulated from each other via the bus bar holder 61.

The bus bar holder 61 includes a base portion holder 61a, a terminal holder 61b, and a terminal guide portion 61c. The base portion holder 61a covers the base portions 62a, 63a, and 64a overlapping in the axial direction, and is formed in a substantially annular shape when viewed from the axial direction.

The terminal holder 61b linearly extends radially outward from the radially outer surface of the base portion holder 61a. The three terminal holders 61b are provided in the circumferential direction, and covers the terminal portions 62c, 63c, and 64c disposed side by side in the circumferential direction and part of the bus bar side connection terminal 65 extending in the radial direction.

The terminal guide portion 61c is connected to the radially outer end of each terminal holder 61b. The terminal guide portion 61c extends in the axial direction and is formed in a tubular shape. The upper surface and the lower face of the terminal guide portion 61c are opened. The terminal guide portion 61c covers part of the bus bar side connection terminal 65 extending in the axial direction. Thus, the bus bar side connection terminal 65 connected to the U-phase, the V-phase, and the W-phase is insulated from each other via the terminal guide portion 61c.

Each bus bar side connection terminals 65 is partially exposed in the inside of the terminal guide portion 61c and is not covered by the terminal guide portion 61c.

The upper surface of the terminal guide portion 61c is opened to form a terminal insertion port 61d. A circuit connection terminal (not illustrated) is inserted into the terminal insertion port 61d and accommodated in the terminal guide portion 61c. The circuit connection terminal is connected to the second circuit board 83 and extends axially downward. The bus bar side connection terminal 65 and the circuit connection terminal (not illustrated) are electrically connected in the terminal guide portion 61c.

The U-phase, V-phase, and W-phase circuit connection terminals (not illustrated) are accommodated in the respective terminal guide portions 61c, so that the circuit connection terminals (not illustrated) of adjacent phases are insulated from each other.

The motor cover 70 is formed in a disk shape and is disposed axially above the bus bar assembly 60 (See FIGS. 1 and 2). The motor cover 70 covers the bus bars 62U, 63V, and 64W from the axially upper side (one axial side), and the radially outer end of the motor cover 70 is located radially outside of the radially outer ends of the base portions 62a, 63a, and 64a. This can prevent dust from adhering to the bus bars 62U, 63V, 64W.

In the present example embodiment, the motor cover 70 is located in an axial gap between the first circuit board 80 and the bearing holder 52. The motor cover 70 covers the shaft 21, the upper bearing 41, and the sensor magnet 91 from above in the axial direction. Therefore, contamination coming out of the gap between the upper bearing 41 and the shaft 21, contamination generated from the sensor magnet 91, and the like can be blocked by the motor cover 70 and prevented from being adhering to the first circuit board 80. Therefore, adhesion of contamination to the first circuit board 80 can be suppressed.

The contamination coming out of the gap between the upper bearing 41 and the shaft 21 is, for example, contamination occurring between the shaft 21 and the rotor core 22. The contamination generated from the sensor magnet 91 is, for example, iron powder or the like attached to the sensor magnet 91.

The motor cover 70 includes a cover projection 71, a first cover rib 72, a second cover rib 73, and a cover recess 74. The cover projection 71 protrudes axially downward from the lower face peripheral end portion of the motor cover 70, and is formed in a substantially annular shape around the center axis C when viewed from the axial direction. The cover projection 71 is located radially inside of the base portion holder 61*a* covering the base portions 62*a*, 63*a*, and 64*a*, and radially opposes the upper end portion of the base portion holder 61*a*. By providing the cover projection 71, it is possible to further prevent the contamination from flowing out to the radial outside of the motor cover 70 and adhering to the first circuit board 80.

The first cover rib 72 protrudes axially downward from the lower face of the motor cover 70 and is formed in a substantially annular shape surrounding the upper cylindrical portion 523*a* of the bearing holder 52. The contamination can be further prevented from flowing out radially outside of the motor cover 70.

The cover recess 74 is located radially inside of the first cover rib 72 and is formed with the lower face recessed axially upward. That is, in the motor cover 70, the axial thickness of the region axially opposing the sensor 81 and the sensor magnet 91 is smaller than the thickness of a region other than the region axially opposing the sensor 81 and the sensor magnet 91. As a result, the sensitivity of the sensor 81 to the sensor magnet can be reduced from being lowered by the motor cover 70. In the motor cover 70, a region axially opposing the sensor 81 and the sensor magnet 91 may be axially penetrated.

The second cover rib 73 protrudes axially upward from the upper surface of the motor cover 70 and axially faces the first circuit board 80. The plurality of second cover ribs 73 radially extend around the rotation axis C from the radially outer side of the region axially opposing the sensor magnet 19 (see FIG. 1). By providing the second cover rib 73, the rigidity of the motor cover 70 is improved, and it is possible to prevent the motor cover from being curved.

The connector unit 82 is electrically connected to the first circuit board (circuit board) 80 and the second circuit board 83, and protrudes axially upward from the upper surface of the cover 53. The connector unit 82 is connected to an external power source to supply a drive current to the first circuit board 80 and the second circuit board 83.

The example embodiments described above are merely examples of the present disclosure. The configuration of the example embodiments may be appropriately changed without departing from the technical idea of the present disclosure. In addition, the example embodiment and the plurality of modifications may be may be implemented in combination within a feasible range. For example, in the present example embodiment, the plurality of connection portions 62*b*, 63*b*, and 64*b* protrudes radially inward from the radially inner surfaces of the base portions 62*a*, 63*a*, and 64*a*, respectively, but the plurality of connection portions 62*b*, 63*b*, and 64*b* may protrude radially outward from the radially outer surfaces of the base portions 62*a*, 63*a*, and 64*a*, respectively.

The motor of the present disclosure can be used for an electric power steering device used for assisting steering wheel operation of a vehicle such as an automobile. The present disclosure is suitable for, for example, a power steering device, but can also be used for other devices such as a blower.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor including an axially extending shaft;
   a stator radially opposing the rotor;
   a bearing that rotatably supports the shaft;
   a motor housing that accommodates the stator and that opens to one axial side;
   a bearing holder that holds the bearing and that covers an opening of the motor housing; and
   a bus bar connected to a conductive wire drawn out from the stator and located on the bearing holder; wherein
   the bearing holder includes a recess that is located radially outside of the bearing and that includes an upper surface recessed to another axial side;
   the bus bar includes:
      a base portion located radially outside of the recess and extending in a circumferential direction; and
      a connection portion that extends from the base portion to the other axial side and that is connected to the conductive wire; and
   at least a portion of the connection portion is located in the recess.

2. The motor according to claim 1, wherein
   the bearing holder includes a coupling portion that is located radially outside of the recess and that protrudes to the other axial side;
   the coupling portion is fitted into an opening of the motor housing; and
   the axially other end of the recess is located on one axial side relative to the axially other end of the coupling portion.

3. The motor according to claim 1, wherein
   a plurality of the base portions have a plate shape and overlap in the axial direction; and
   the connection portion extends radially inward from a radially inner surface of each of the base portions.

4. The motor according to claim 1, wherein the bus bar includes a terminal portion extending radially outward from a radially outer surface of the base portion and connected to an external connection terminal.

5. The motor according to claim 1, wherein a circuit board on which a sensor to detect a rotational position of the rotor is mounted is located on one axial side of the bus bar.

6. The motor according to claim 5, wherein the sensor is located on one axial side of the shaft and detects a rotational position of the rotor by detecting a magnetic flux of a sensor magnet located at one axial side end portion of the shaft.

7. The motor according to claim 6, wherein
the sensor magnet is connected to the shaft via a magnet holding portion;
the bearing holder includes a tubular cylindrical portion that surrounds the center axis and in which the magnet holding portion is located; and
one axial end of the magnet holding portion is located on the other axial side relative to one axial end of the cylindrical portion.

8. The motor according to claim 7, wherein another axial end of the connection portion is located on the other axial side relative to the one axial end of the magnet holding portion.

9. The motor according to claim 6, wherein at least a portion of the base portion overlaps with the sensor magnet in the radial direction.

10. The motor according to claim 1, further comprising a motor cover that covers the bus bar from one axial side.

11. The motor according to claim 10, wherein the motor cover has a disc shape, and includes a radially outer end located radially outside of a radially outer end of the base portion.

12. The motor according to claim 1, wherein
a circuit board on which a sensor that detects a rotational position of the rotor is mounted is located on one axial side of the bus bar;
the sensor is located on one axial side of the shaft and detects a rotational position of the rotor by detecting a magnetic flux of a sensor magnet located at one axial side end portion of the shaft;
the motor further includes a motor cover that covers the bus bar from one axial side and that is located on the other axial side relative to the circuit board; and
the motor cover has an axial thickness of a region axially opposing the sensor and the sensor magnet thinner than a thickness of a region other than the region axially opposing the sensor and the sensor magnet.

* * * * *